Figure 1:
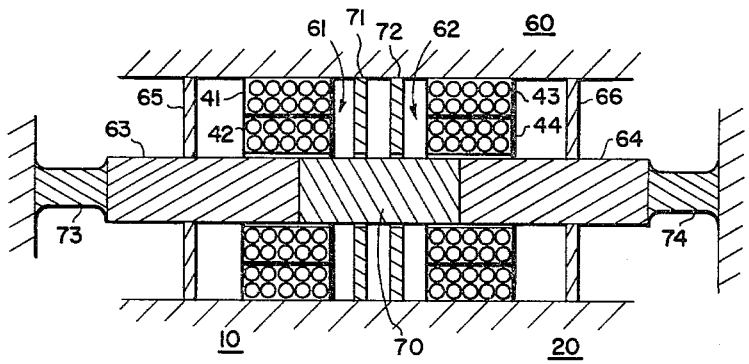

March 8, 1966  D. T. LONGLAND  3,239,657

CONTROL APPARATUS

Original Filed Oct. 11, 1961

INVENTOR.
DONALD T. LONGLAND
BY
Roger W. Jensen
ATTORNEY

United States Patent Office 3,239,657
Patented Mar. 8, 1966

3,239,657
CONTROL APPARATUS
Donald T. Longland, South Sudbury, Mass., assignor to Honeywell Inc., a corporation of Delaware
Original application Oct. 11, 1961, Ser. No. 144,342. Divided and this application Dec. 20, 1962, Ser. No. 246,110
7 Claims. (Cl. 235—194)

This application is a division of my copending application Serial No. 144,342 filed October 11, 1961, now abandoned.

This invention relates to control apparatus and more particularly to magnetic multiplying devices.

In the present invention a magnetic device is provided which in the preferred embodiment is illustrated as a solenoid type of device. More specifically the device includes a first and a second solenoid means each having a hollow cylindrical winding. The two solenoid means are mounted by suitable means in axial alignment. Each of the solenoid means has associated therewith a relatively movable magnetic member, core or plunger generally positioned within the hollow central opening. Two movable members are connected fixedly to one another by suitable means and the resultant assembly in turn is supported concentrically within the solenoid means by suitable means which permit relative axial movement therebetween. The movable magnetic members are proportioned in axial length and in axial spacing with respect to the axial length and spacing of the first and second solenoid means so that, as one member moves in one sense relative to its coacting solenoid means, the other simultaneously moves in the other sense with respect to its coacting solenoid means. Accordingly when each solenoid means is energized so as to produce magnetic flux the resultant forces developed on the movable magnetic assembly are in opposite directions or senses.

Each of the windings of the first and second solenoid means are comprised of two coils. The two coils of each of the windings are connected together and are adapted to have applied thereto the same pair of currents. The connections are made such that the first solenoid means acts as an adding magnetic circuit or means. That is, each of the two coils of the winding produce flux which travels through the core in the same direction thereby adding. The two coils of the second solenoid means are connected so that the total flux in the core is proportional to the difference between the flux produced by the first current and the flux produced by the second current. Thus, the second solenoid means is a subtracting magnetic current or means.

The movable magnetic member of the first solenoid is acted upon by a force which is proportional to the sum of the fluxes produced by the pair of currents applied to the winding. The second movable magnetic member is acted upon in the opposite direction of the first movable member by a force which is proportional to the difference between the fluxes produced by the pair of currents applied to the winding. Thus, the total force acting upon the movable member assembly is the difference between the two forces acting upon each of the movable members independently and it will be shown mathematically that this total force is proportional to the product of the pair of currents applied to the two windings.

The first and second solenoids are fixedly attached to a support means. The movable members or plungers associated with the first and second solenoids are connected to the support means by first and second pickoff means which produce useful signals and yet which prevent any substantial relative movement between the movable members and the first and second solenoid means. By preventing any substantial relative movement of the components of the magnetic circuits the magnetic constants remain substantially constant throughout a large range of currents applied to the coils of the solenoids, and the multiplying action of the apparatus remains linear over a large range of input currents, as will be shown more clearly later. Thus, a multiplying device has been provided which can easily and accurately multiply currents throughout a relatively large range. The present invention is also very easy and inexpensive to construct.

Accordingly it is an object of this invention to provide a new and improved control apparatus.

It is a further object of this invention to provide a new and improved multiplying device.

It is a further object of this invention to provide a multiplying device which can multiply current accurately and efficiently throughout a relatively large range.

Figure 2:
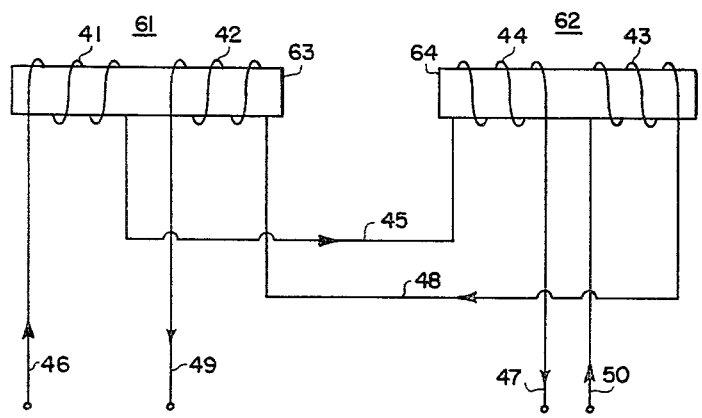

These and other objects of this invention will be set forth more fully in and become apparent from a reading of the following specification and claims in conjunction with the accompanying drawings in which:

FIGURE 1 is a cross-sectional view of a double solenoid type multiplying device; and FIGURE 2 is a somewhat schematic representation of the connection of the windings.

In FIGURE 1 a cross-sectional view of a double solenoid type multiplying device is shown. The first magnetic member or solenoid type device, which is the left half of FIGURE 1 is generally designated by the numeral 10 and the second magnetic member or solenoid type device which is the right half of FIGURE 1 is generally designated by the numeral 20. An outer cylindrical housing or support means 60, only partially shown, has attached to its inner surface a pair of hollow cylindrical windings 61 and 62. Support means 60 is comprised of magnetic material and may be in a variety of shapes, the present being a preferred embodiment. Windings 61 and 62 are spaced apart along the axis of housing 60 and each winding has a central aperture concentric with the axis of the housing 60. A magnetic core member 63 is slidably positioned within the aperture of winding 61 and maintained at a concentric position by a sustaining or core support means 65. Sustaining means 65 may be a diaphragm type spring or any other convenient sustaining means. A magnetic core 64 is slidably mounted within the aperture in winding 62 and maintained at a concentric position by a sustaining or core support means 66. Sustaining means 66 is similar to sustaining means 65.

A connecting means 70 rigidly connects movable member 63 and movable member 64. Connecting means 70 is composed of a non-magnetic material and may be connected to core 63 and core 64 by any convenient method such as gluing. A pair of shields 71 and 72 composed of a highly permeable material are positioned so that the flux produced by winding means 61 is shielded from the flux produced by winding means 62. Centrally located shield 71 and shield 72 each having an aperture concentric with the housing axis and with a large enough diameter so that connecting means 70 will slide freely therethrough. Thus, core 63, connecting means 70 and core 64 form a cylindrical bar or magnetic member or movable magnetic assembly which is freely movable through the apertures in winding 61, shield 71, shield 72 and winding 62.

Winding means 61 and winding means 62 are each comprised of two separate coils. The coils are shown as concentric cylindrical coils in FIGURE 1 for convenience but it should be noted that any of a variety of coils which produce a force on the magnetic members 63 and 64 could be used. Winding means 61 is comprised of a first coil 41 and a second coil 42 depicted in FIGURE 2. Winding means 62 is comprised of a first coil 43 and a second coil 44. One side of coil 41 is connected to one side of coil 44 by a lead 45. The other side of coil 41 is connected to a lead 46 and the other side of coil 44 is connected to a lead 47. Lead 46 and lead 47 are adapted to have a current applied thereto. One side of coil 42 is connected to one side of coil 43 by a lead 48. The other side of coil 42 is connected to a lead 49 and the other side of coil 43 is connected to lead 50. Leads 49 and 50 are adapted to have a second current applied thereto. The connection of coils 41 and 42 of winding means 61 are such that the current applied to leads 46 and 47 causes a flux in a first direction through core 63 and the current applied to leads 49 and 50 causes a flux in a second direction through core 63. Thus, the total flux in core 63 is the difference between the first flux caused by the current applied to leads 46 and 47 and the second flux caused by the current applied to leads 49 and 50. Because the total flux in core 63 is the difference between the fluxes caused by the two currents, magnetic circuit 10 is known as a subtracting magnetic circuit.

Coil 43 and coil 44 of winding means 62 are connected so that the flux in core 64 caused by the current applied to leads 46 and 47 in coil 44 adds to the flux caused by the current applied to leads 49 and 50 in coil 44. Thus, the total flux in core 64 is the sum of the flux caused by the current flowing in coil 43 and coil 44 and magnetic circuit 20 is known as an adding magnetic circuit.

The total flux flowing in magnetic circuit 10 may be represented by Formula 1.

$$\phi_{10} = K_1(NI_1 - NI_2) \quad (1)$$

$K_1$ equals the constants of the circuit, N equals the number of turns in each of the coils 41, 42, 43 and 44, $I_1$ equals the current applied between leads 46 and 47, and $I_2$ equals the current applied between leads 49 and 50.

The total flux flowing in magnetic circuit 20 may be represented by Formula 2.

$$\phi_{20} = K_2(NI_1 + NI_2) \quad (2)$$

$K_2$ equals the constants of the second magnetic circuit.

It is well known in the art that the force which either one of the forcing means, winding means 61 or winding means 62 exerts on the movable member, consisting of core 63, member 70 and core 64, can be represented by Formula 3.

$$F = K\phi^2 \quad (3)$$

The K's or the constants in Formula 1 and Formula 2 are dependent upon the width of the air gap in the magnetic circuit, among other things. In the present device $K_1$ in Formula 1 will be the same as $K_2$ in Formula 2 if the air gaps between core members 63 and support means 60 equals the air gaps between core member 64 and support means 60. Thus, assuming that the K's in the formulas for the flux in magnetic circuit 10 and magnetic circuit 20 are equal, the total force on the bar or movable magnetic assembly consisting of members 63, 70 and 64 may be represented by Formula 4.

$$F = K\phi_{10}^2 - K\phi_{20}^2 \quad (4)$$

Because of the previous assumption, Formula 4 may be expanded to Formula 5.

$$F = KK_1^2N^2(I_1^2 + 2I_1I_2 + I_2^2 - I_1^2 + 2I_1I_2 - I_2^2) \quad (5)$$

Formula 5 may then be reduced to Formula 6 by simple algebra.

$$F = 4KK_1^2N^2I_1I_2 \quad (6)$$

In Formula 6 the total force on members 63, 70 and 64 is proportional to a constant times the product of the first and second current applied to winding means 61 and 62. Thus, the total force tending to move members 63, 70 and 64 is proportional to the product of the two currents applied to the present device and a multiplying means has been provided.

A first pickoff means 73, shown in FIGURE 1, is attached, by some convenient means such as gluing, between the free end of movable member 63 (the left end in FIGURE 1) and the support means 60. Pickoff means 73 fixedly connects member 63 to support means 60 in a manner to substantially prevent relative movement therebetween. A second pickoff means 74 is attached, by some convenient means such as gluing, between the free end of movable member 64 (the right end in FIGURE 1) and the support means 60. Pickoff means 74 fixedly connects member 64 to support means 60 in a manner to substantially prevent relative movement therebetween. Pickoff means 73 and 74 may be any of a variety of force indicating means, for example in this preferred embodiment a semiconductor strain gauge is utilized, and the invention is not meant to be limited by this preferred embodiment.

When winding means 61 and 62 are energized they exert a force on core 63 and core 64 respectively, a force is thereby exerted on semiconductor strain gauge element 73 and semiconductor strain gauge element 74. The force on one of the elements will be compression and the force on the other element will be tension since the strain gauge elements are connected by some convenient means such as gluing between the ends of the movable members 63 and 64, and the support means 60.

The outputs from the strain gauge elements 73 and 74 may be utilized by placing them in two legs of a strain gauge electrical bridge circuit. In this manner when any unbalance occurs due to a force exerted on the strain gauge an output will be produced from the bridge. The use of force indicating means, such as strain gauges, in the circuit as a pickoff means has the advantage of maintaining the magnetic circuits equal. That is, as previously explained, Formula 5 can be obtained from Formula 4 only if the constants of the two magnetic circuits are equal. The constants of the two magnetic circuits are equal when the air gaps remain the same. Thus, strain gauge 73 maintains the gap between core 63 and support means 60 approximately equal to the gap maintained between core 64 and support means 60 by strain gauge 74. By using strain gauges 73 and 74 as pickoff means the device is linear over a wider range of forces, or in other words, over a wider range of input currents.

While separate sustaining or support means 65 and 66 and pickoff means 73 and 74 have been illustrated and described, it will be understood by those skilled in the art that the sustaining and pickoff functions as described more completely above could be provided by a single means.

Thus a magnetic multiplying device has been disclosed which will accurately provide an output that is proportional to the product of a pair of input currents. Also, the device is efficient to operate and easy and inexpensive to construct.

While I have shown and described a specific embodiment of the invention, further modifications and improvements will occur to those skilled in the art. I desire therefore that this invention not be limited to the particular form shown and that the appended claims cover all modifications which do not depart from the spirit and scope of the invention.

I claim as my invention:

1. Current multiplying apparatus of the class described comprising: support means; a magnetic member; means yieldably mounting said member on said support means; first inductive means positioned adjacent said member for applying a first force to said member tending to move said member relative to said support means in a first sense, said first force being a square function of the sum of a first and second variable; second inductive means positioned adjacent said member for applying a second force to said member tending to move said member relative to said support means in a sense opposite to that associated with said first force, said second force being a square function of the difference of the first and second variables; force responsive pickoff means, said pickoff means being connected to said magnetic member and to said support means so as to prevent any substantial relative movement therebetween and said pickoff means providing an output indicative of the net force applied thereto, said net force being indicative of the product of said first and second variables.

2. Current multiplying apparatus of the class described comprising: support means; a magnetic member; means mounting said member on said support means; means applying a first force to said member tending to move said member relative to said support means in a first sense, said first force being a square function of the sum of a first and second variable; means applying a second force to said member tending to move said member relative to said support means in a sense opposite to that associated with said first force, said second force being a square function of the difference of the first and second variables; and force responsive pickoff means, said pickoff means being connected to said magnetic member and to said support means so as to prevent any substantial relative movement therebetween and said pickoff means providing an output indicative of the net force applied thereto, the output being indicative of the product of said first and second variables.

3. Current multiplying apparatus of the class described comprising: support means; a magnetic member; means mounting said member on said support means; coil means applying a first force to said member tending to move said member relative to said support means in a first sense, said first force being a square function of the sum of a first and second variable; coil means applying a second force to said member tending to move said member relative to said support means in a sense opposite to that associated with said first force, said second force being a square function of the difference of the first and second variables; and force responsive pickoff means, said pickoff means being connected to said magnetic member and to said support means so as to prevent any substantial relative movement therebetween and said pickoff means providing an output indicative of the net force applied thereto, said net force coacting with said pickoff means so that the output thereof is indicative of the product of said first and second variables.

4. Multiplying apparatus of the class described comprising: support means; a magnetic member; means applying a first force to said member tending to move said member relative to said support means, said first force being a square function of the sum of a first and second variable; means applying a second force to said member tending to move said member relative to said support means, said second force being a square function of the difference of the first and second variables, and said second force being in a direction opposite to said first force; force responsive pickoff means providing an output indicative of the product of the first and second variables; and means connecting said pickoff means to said magnetic member and said support means to substantially prevent relative movement therebetween.

5. Multiplying apparatus of the class described comprising: a magnetic member; means applying a first force to said member, said first force being a square function of the sum of a first and second variable; means applying a second force to said member, said second force being a square function of the difference of the first and second variable, and said second force being in a direction opposite to said first force; force indicating means, said indicating means providing an output indicative of the product of the first and second variables; and means attaching said indicating means to said magnetic member in a manner substantially preventing said magnetic member from moving relative to said means applying a first force and said means applying a second force.

6. Multiplying apparatus of the class described comprising: a first and a second magnetic circuit, said first and second magnetic circuits having first and second movable magnetic members respectively therein; connecting means fixedly connecting said first and second movable members; first and second electrical force producing means, said first force producing means applying a force to said first movable member which is a function of the product of a first constant and the square of the sum of a first and a second variable, and said second force producing means applying a force to said second movable member which is a function of the product of a second constant and the square of the difference between said first and second variables; force indicating means activated by said first and second movable magnetic members; and means for mounting said first and second movable magnetic members within said first and second magnetic circuits, respectively, in a manner substantially preventing said movable members from causing said constants to fluctuate.

7. Multiplying apparatus of the class described comprising: support means; a magnetic member; means applying a first force to said member tending to move said member relative to said support means, said first force being a square function of the sum of a first and a second variable; means applying a second force to said member tending to move said member relative to said support means, said second force being a square function of the difference of the first and second variables, and said second force being in a direction opposite to said first force; force responsive pickoff means connected to said member and responsive to force applied to said member for producing a signal indicative of said force; and means connecting said member to said support means so as to prevent any substantial relative movement therebetween.

References Cited by the Examiner
UNITED STATES PATENTS

| 2,513,899 | 7/1950 | Taylor | 235—194 |
| 2,686,635 | 8/1954 | Markson | 235—196 X |
| 2,835,442 | 5/1958 | Parnell | 235—194 |

MALCOLM A. MORRISON, *Primary Examiner.*

A. J. SARLI, *Assistant Examiner.*